United States Patent
Kimmel et al.

[11] 3,821,635
[45] June 28, 1974

[54] CAPACITOR CHARGING CIRCUIT

[75] Inventors: Donald S. Kimmel, Monroeville; Derek A. Paice, Murrysville, both of Pa.

[73] Assignee: Westinghouse Electric Corporation, Pittsburgh, Pa.

[22] Filed: Nov. 1, 1972

[21] Appl. No.: 302,941

[52] U.S. Cl............. 323/102, 307/45, 307/82, 307/87, 307/109, 320/1, 323/1, 323/106
[51] Int. Cl............................................. G05f 1/68
[58] Field of Search ......... 320/1; 307/43 R, 45, 46, 307/60, 66, 75, 82, 83, 87, 107, 108, 109; 321/20, 27 R; 323/25, 1, 4, 102, 7, 106, 119

[56] References Cited
UNITED STATES PATENTS

| | | | |
|---|---|---|---|
| 2,825,865 | 3/1958 | Hauck et al. | 323/7 X |
| 3,141,124 | 7/1964 | Atherton | 307/43 R |
| 3,470,444 | 9/1969 | Bixby | 321/20 X |
| 3,526,821 | 9/1970 | Thomas | 320/1 |
| 3,599,037 | 8/1971 | Grace | 323/7 UX |
| 3,654,337 | 4/1972 | Coffey | 307/83 X |
| 3,723,855 | 3/1973 | Shuleshko | 321/27 X |

Primary Examiner—Gerald Goldberg
Attorney, Agent, or Firm—D. Schron

[57] ABSTRACT

A capacitor is repetitively charged and discharged for use in flash tube apparatus, or the like. An AC supply is utilized and current from the AC supply is maintained substantially constant while the charging current is made to vary with time to achieve a substantially constant power charge rate while maintaining a nearly unity power factor on the AC supply.

10 Claims, 9 Drawing Figures

CAPACITOR CHARGING CIRCUIT

BACKGROUND OF THE INVENTION

1. Field of the Invention

This invention in general relates to apparatus for charging capacitor circuits and more particularly to such apparatus operable with an AC supply.

2. Description of the Prior Art

Flash lamps are utilized in various applications such as the fields of television, photography and lasers, to name a few, for providing, on demand, an intense flash of light. To accomplish this, a capacitor, or bank of capacitors, is charged up to a desired voltage and is thereafter discharged into the lamp circuit to produce the light. After discharge, the capacitor must again be charged up if additional flashes are required, which is generally the case.

Many conventional techniques exist, using an AC or DC supply, for charging capacitors. For many applications, size of equipment is of no concern and more than sufficient energy is available for charging. The charging efficiency, which is the relation of energy stored in the capacitor to energy applied to the charging circuit, is relatively low, however this is of little concern since the capacitor does get charged up to the prescribed level. For some purposes a charging time of 3 seconds, for example, is just as acceptable as a charging time of two seconds.

There are many instances however, where the design of the charging circuit can be very stringent. For example, only a limited power source may be available for charging. The space available for the charging circuit may be limited, and efficiency in regard to watt-seconds stored, compared to volt-amperes drawn from the supply, becomes of prime importance in the design of the charging circuit. The more power which is wasted, the less efficient is the circuit with the consequent generation of unwanted heat which may cause a problem.

The present invention provides a charging circuit which enables capacitors to be charged from an AC supply in a more efficient manner than heretofore.

SUMMARY OF THE INVENTION

The present invention charges an initially discharged capacitor to a certain desired voltage level in a fixed time and requires a minimum volt-amperes from an AC supply of a fixed frequency and voltage. A nearly constant power charge rate on a capacitor is utilized while there is maintained a nearly unity power factor on the AC supply. To accomplish this operation, there is provided a current regulatory means which is connected to the input AC supply for maintaining the supply current at a substantially constant value, independent of any load on the current regulatory means. A circuit connected between the current regulatory means and the capacitor to be charged regulates the apparent resistance presented at the output of the current regulatory means as the capacitor is being charged. One way of accomplishing this is by utilization of a transformer having a primary connected to the current regulatory means and having a plurality of secondary windings which can be selectively inserted in circuit, in response to predetermined voltage levels attained by the capacitor being charged.

DESCRIPTION OF THE PREFERRED EMBODIMENT

Figure 1:
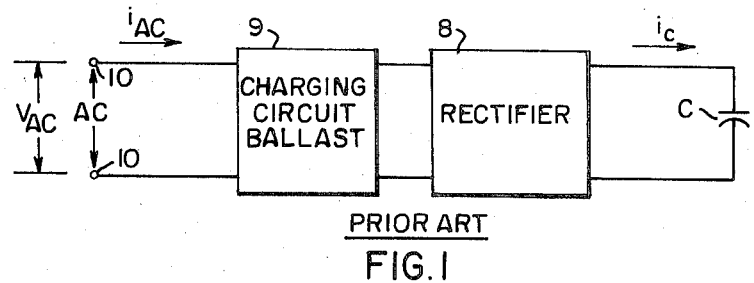
FIG. 1 illustrates a prior art arrangement for charging a capacitor.
Figure 2:
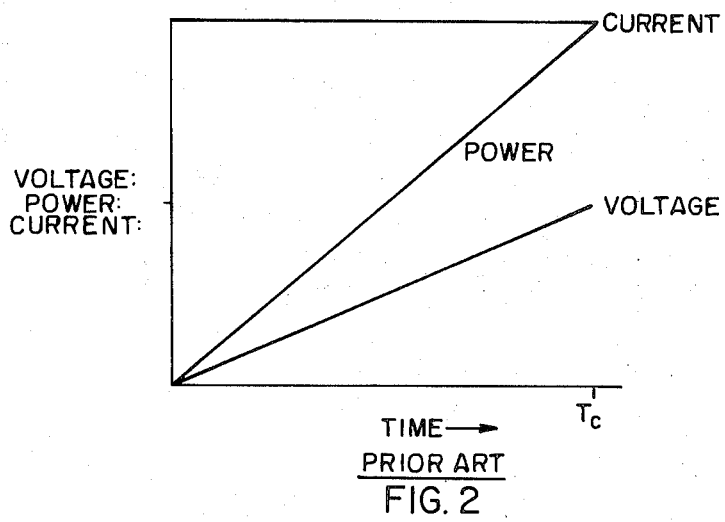
FIG. 2 are curves illustrating the current, voltage and power relationships of FIG. 1.

In FIG. 1, illustrating a prior art arrangement an output capacitor C to be charged is provided with charging current $i_c$ from rectifier 8 and charging circuit 9 having input 10 connected to an AC supply. The charging circuit 9 is constructed and arranged to provide, by means of inductive ballasting for example, a constant current charge as illustrated by the current waveform in FIG. 2. The voltage across the capacitor builds up as indicated by the voltage waveform and since power is equal to the voltage times the current, the charging power as indicated by the power curve increases in proportion to the voltage. Such an arrangement has a conversion efficiency of only 50 percent because at the conclusion of the charge of time $T_c$ the charging power is twice the average power. At the beginning of the charge, the arrangement is not fully utilizing the source capability while toward the termination of charge, excessive demands are made on the system and this is a particularly important consideration where the power source is required to supply other portions of the system in which the charging circuit may be located.

An arrangement which would charge the capacitor at a constant power rate in a manner to require a minimum volt-amperes from the source would be most desirable. To be most efficient, however, the power factor of the circuit must be maintained near unity.

Figure 3:
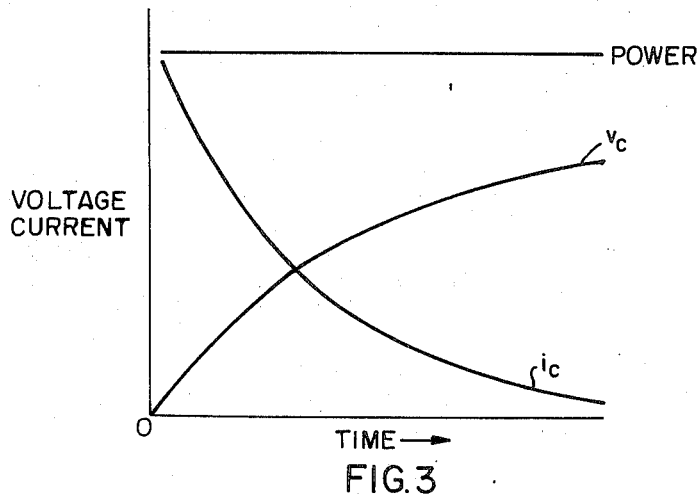
FIG. 3 illustrates a desired capacitor charging pattern.

FIG. 3 illustrates the voltage and current curves on the capacitor to be charged in order to arrive at a constant power charge rate, in other words, $v_c i_c = K$. Since $i_c$ is equal to $C\delta V_c/\delta t$ the voltage curve $v_c$ is proportional to $\sqrt{T}$ and the current curve $i_c$ is proportional to $1/\sqrt{T}$. In FIG. 3, the curve $i_c$ must be given some limiting value at $t = 0$ since it cannot be the theoretical required value of infinity.

Figure 4:
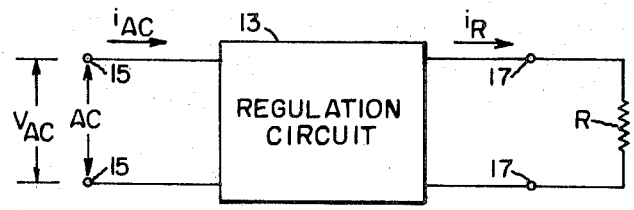
FIG. 4 and FIG. 5 illustrate a portion of the charging circuit of the subject invention.
Figure 5:
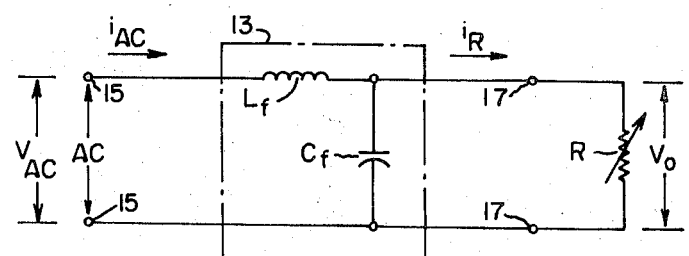

In order to achieve a constant power charge rate, while maintaining a power factor as near to unity as possible, the present invention employs, inter alia, regulatory means for maintaining the AC supply current at a constant value (rms). FIG. 4 illustrates this arrangement and includes a regulatory means in the form of regulation circuit 13 having input means 15 connected to a source of AC power operable at a nominally constant voltage and frequency. The AC source may be a generated sine wave at a wave provided by an inverter circuit, for example. A resistance R is connected to the output 17 of the regulation circuit 13 and draws a current of $i_R$. The regulation circuit 13 is operative such that for any value of R presented at the output 17 the input current $i_{AC}$ will remain at a constant value. One regulation circuit which accomplishes the aforementioned is illustrated in FIG. 5 as a filter network including an inductor $L_f$ and capacitor $C_f$. By proper choice of inductor and capacitor values $i_{AC}$ can be held to a constant value regardless of the value of resistance presented to the output 17.

Since the charging capacitor and associated rectifier circuitry can be considered as the work load, it may be represented by a slowly varying resistive load. Thus, in FIG. 5, the variable resistor R connected at the output 17 of the regulation, or filter circuit 13, represents the output capacitor being charged.

If the inductor $L_f$ and capacitor $C_f$ are chosen, such that $\omega^2 L_f C_f = 0.5$ ($\omega = 2\pi$ times the fundamental frequency $f$) the AC input current drawn is constant regardless of the value of resistance load R and accordingly, the supply is always operating at constant volt-amperes. An additional problem presents itself however in that the power factor associated with such circuit must be kept at unity or as close to unity as practical to maintain a high efficiency.

Figure 6:
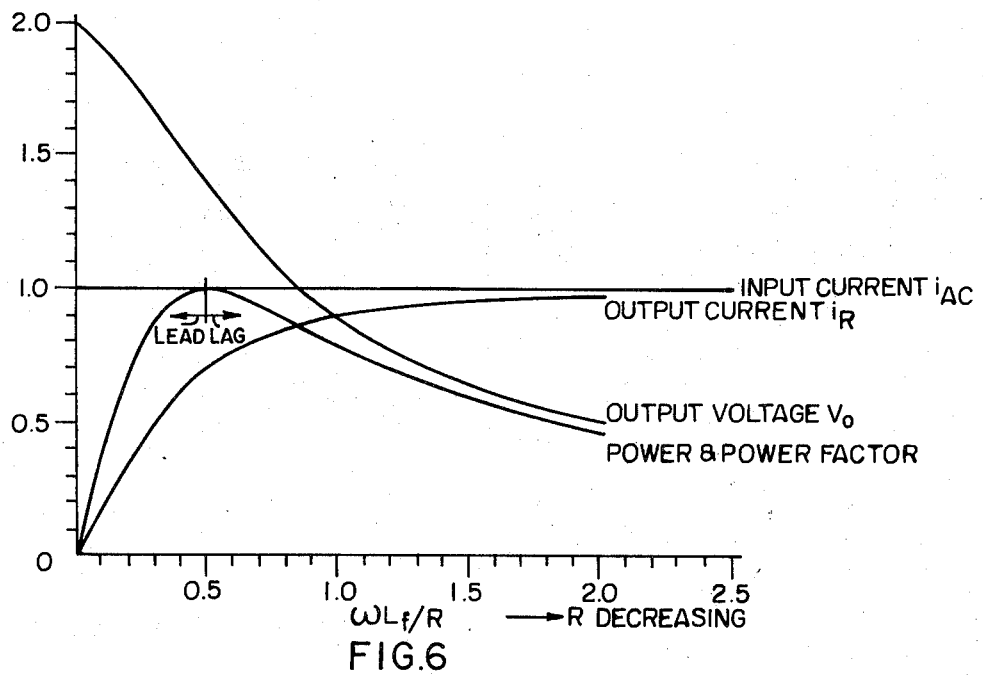
FIG. 6 illustrates various curves describing the operation of the circuitry of FIG. 5.

It will be remembered that the power factor is the ratio of active power to apparent power and is equal to the cosine of the phase angle between the current $i_{AC}$ and the voltage $V_{AC}$. If the circuit presented to the source is purely capacitive, the power factor will be 0 percent leading, and if purely inductive, the power factor will be 0 percent lagging. Taking the power factor into consideration, total power is equal to voltage times current times power factor. The voltage is supplied at a constant value, the current is held constant by the regulation circuit 13 while the power factor varies as the value of resistance R varies. The relationship of the various parameters of FIG. 5 are illustrated in FIG. 6 wherein voltage, current and power have been rationalized such that the vertical axis shows relative units wherein voltage is relative to the input voltage $V_{AC}$, current is relative to $V_{AC}/\omega L_f$ and power is relative to $V_{AC}^2/\omega L_f$. A representation of resistance value is plotted on the horizontal axis wherein the units represent $\omega L_f/R$ such that the value of R is decreasing as one proceeds toward the right.

Due to the choice of filter component $L_f$ and $C_f$ values, the input current $i_{AC}$ is constant for any value of R. As the value of R is increased (that is, proceeding from right to left, on the horizontal axis) it is seen that the power factor varies from lag to lead with a maximum of unity occurring at approximately $\omega L_f/R = 0.5$. Thus, it is seen from FIG. 6, that if R can be held to a certain constant value, where the power factor is maximum, then the power (power = voltage x current x power factor) will be at a maximum for a given input. In the absence of maintaining R at that constant value, it would be desirable to maintain R within certain limits such that the power factor varies about the maximum, within acceptable design limits.

In the present invention, circuit means are connected between the output of the current regulation circuit and the output capacitor to be charged for regulating the apparent resistance presented to the output of the current regulation circuit in order to optimize the power factor as the capacitor is being charged. Accordingly, in FIG. 7, there is included a power factor regulation circuit 20 connected to the output 17 of the current regulation circuit 13. The capacitor C to be charged, is connected to the output 22 of the circuit 20.

In operation, the power factor regulation circuit 20 reflects back to the current regulation circuit output 17, the impedance of the capacitor C as it is charging and is responsive to a predetermined condition thereof for changing the apparent resistance reflected, in order to maximize the circuit power factor.

Figure 7:
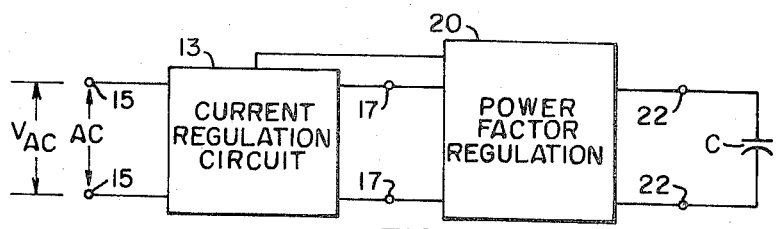
FIG. 7 is a block diagram of a preferred embodiment of the present invention.
Figure 8:
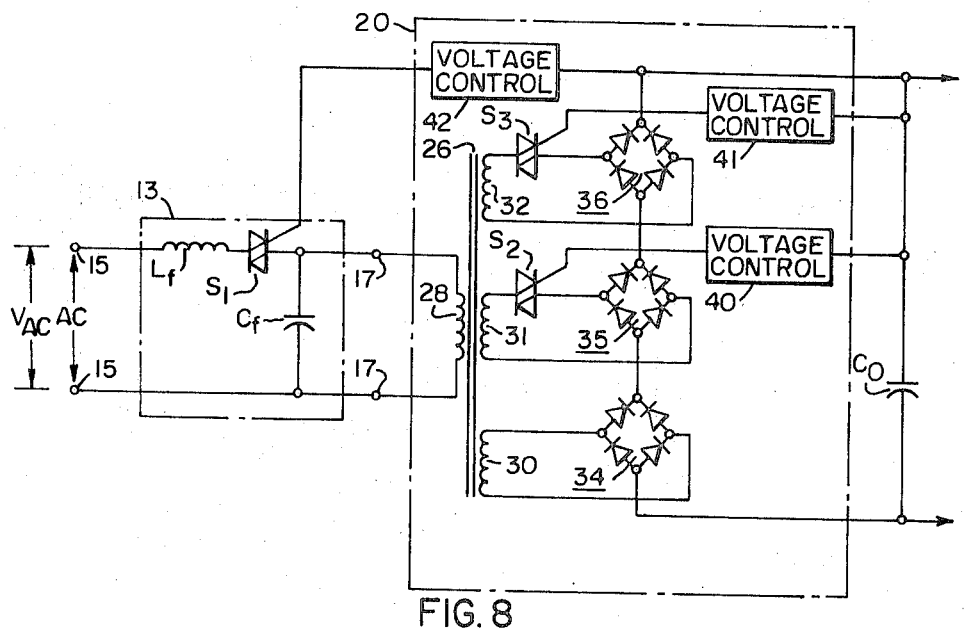
FIG. 8 is a more detailed circuit of the preferred embodiment.

FIG. 8 illustrates a detailed embodiment of FIG. 7 and components which have been previously described have been given like reference numerals. The power factor regulation circuit 20 connected to the output 17 of the current regulation circuit 13 includes a transformer 26 having a primary winding 28 connected to output 17 and a plurality of secondary windings 30, 31 and 32 connected to respective bridge rectifier circuits 34, 35 and 36 in order to supply charging current to output capacitor $C_0$.

A controlled AC switch $S_1$ is located in an input line and controlled AC switches $S_2$ and $S_3$ are connected respectively to secondary windings 31 and 32. These switches are closable to pass AC in response to a predetermined condition of the output capacitor $C_0$. In the embodiment illustrated in FIG. 8, a plurality of voltage control circuits 40, 41 and 42 sense the voltage on output capacitor $C_0$ as it is being charged and when the voltage attains a predetermined set value, the voltage control circuits are operative to provide the necessary output signal to open or close the switch to which it is connected. More particularly, at the start of charging, the voltage on the output capacitor is zero and the output of voltage control circuit 42 is such that switch $S_1$ is closed to pass current. Voltage control circuits 40 and 41 are responsive to the zero output voltage to maintain switches $S_2$ and $S_3$ in an open condition such that output capacitor $C_0$ is initially charged through secondary winding 30. When the capacitor voltage reaches a first predetermined value, switch $S_2$ is closed by voltage control circuit 40 such that the output capacitor is now charged through secondary windings 30 and 31. When the output voltage attains a second predetermined value, switch $S_3$ is closed by voltage control network 41 and all three windings are in the charging circuit. When the capacitor reaches the desired design voltage, switch $S_1$ is open by voltage control circuit 42 to terminate the charging process. Should the output voltage drop, switch $S_1$ may be reclosed to provide some more charging current to again bring the voltage up to its required value.

As the capacitor charges up there is an apparent resistance at output 17 of current regulation circuit 13. This apparent resistance as previously described varies in value and causes the power factor to vary as illustrated in FIG. 6. Initially, the operating point on the power factor curve of FIG. 6 proceeds from right to left, from a lagging condition to a maximum and then to a leading condition. It will be remembered that it is desired to maintain the power factor as close to unity as possible and with the circuit of FIG. 8, when the secondary winding 31 is placed in circuit by the switch $S_2$ the apparent resistance at output terminal 17 changes in accordance with the square of the turns ratio such that the operating point on the power factor curve jumps to the lagging condition and again proceeds toward the leading condition as charging continues. When switch $S_3$ places the third winding 32 in circuit, the operating point against jumps to the lagging condition and proceeds toward the maximum.

Only three secondary windings and associated switching circuitry are illustrated in FIG. 8 Additional windings will permit the operating point to vary very closely around unity power factor and if the apparent resistance can be varied in an infinite number of steps, operation would be at unity power factor for the entire charge duration. With the proper selection of the number of secondary windings and their turns ratio together with a trade-off consideration of size and weight, an approximation to a constant power charge can be realized.

Figure 9:
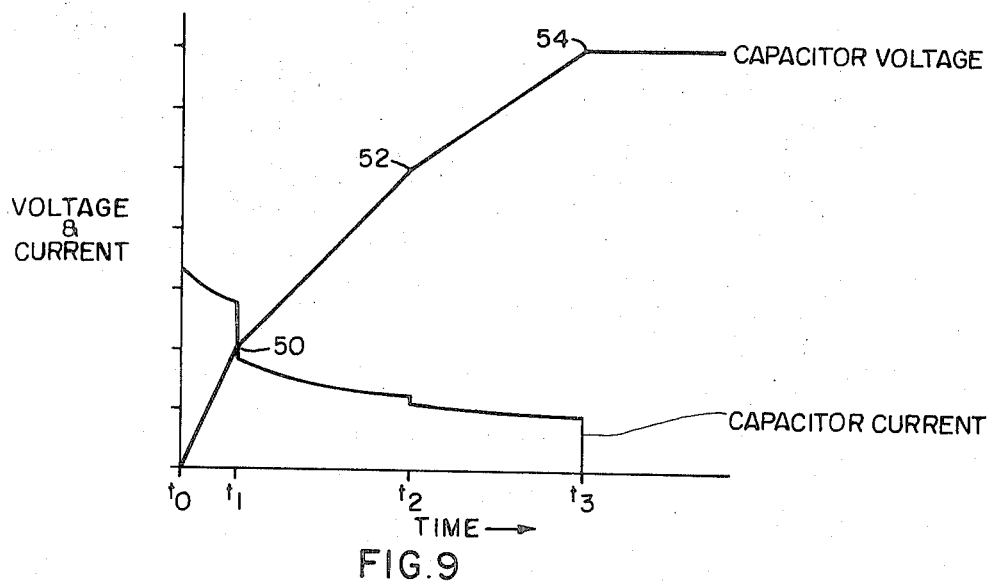
FIG. 9 are curves illustrating the charging patterns of the output capacitor of FIG. 8.

With three equal secondary windings 30, 31 and 32, the profile of charge current into the capacitor is as illustrated in the curve of FIG. 9 which additionally shows the capacitor voltage. From time $t_0$ to $t_1$ current is supplied through secondary winding 30. As the capacitor voltage builds up, it attains a predetermined value at point 50 at which time switch $S_2$ is caused to close to place winding 31 into the charging circuit. With a greater number of turns in the secondary, the current is reduced and as the voltage builds up a second point, 52, is attained whereby voltage control circuit 41 actuates switch $S_3$ to place secondary winding 32 into the charging circuit. The greater number of secondary turns further reduces the capacitor current and at point 54, indicative of the final desired voltage value, the voltage control circuit 42 opens switch $S_1$ to terminate the charge.

With a greater number of secondary windings, the capacitor current curve would have a greater number of steps and the capacitor voltage curve would have a greater number of bends until such point that were an infinite control provided, the two curves would appear as curves $V_c$ and $i_c$ previously described with respect to FIG. 3. With only three windings however, as described in FIG. 8, the regulation can still be held within very acceptable limits.

What is claimed is:

1. A charging circuit for capacitors comprising:
A. input means for receiving input AC power;
B. a capacitor circuit to be charged;
C. current regulatory means having an output and connected to said input means for maintaining the supply current at a substantially constant value, for a given supply voltage and frequency, independent of the load at said output; and
D. circuit means connected between said output and said capacitor circuit to be charged for regulating the apparent impedance presented to said output as said capacitor circuit is being charged;
E. said circuit means being operable in conjunction with said regulatory means, to maintain a near unity power factor of said charging circuit.

2. Apparatus according to claim 1 wherein:
A. said circuit means includes sensor means for sensing a predetermined condition of said capacitor circuit as it is being charged providing a control signal when said condition is attained; and
B. means responsive to said control signal for increasing said apparent impedance presented to the output of said current regulatory means.

3. Apparatus according to claim 2 which includes:
A. a plurality of said sensor means.

4. Apparatus according to claim 2 wherein:
A. said sensor means is a voltage sensor and said predetermined condition is a particular voltage.

5. Apparatus according to claim 1 wherein:
A. said circuit means includes a transformer having a primary winding connected to said output and a plurality of secondary windings; and which includes,
B. a plurality of rectifier units connected to respective ones of said secondary windings and to said capacitor circuit to be charged; and
C. means for selective inserting certain ones of said secondary windings in circuit in response to certain predetermined voltage levels attained by said capacitor circuit as it is being charged.

6. Apparatus according to claim 5 which includes:
A. controlled switches connected in series with said certain secondary windings;
B. voltage sensor means connected to said capacitor circuit for providing control signals when said predetermined voltage levels are attained; and
C. said controlled switches being connected to receive respective ones of said control signals.

7. Apparatus according to claim 6 wherein:
A. said controlled switches are AC controlled switches.

8. Apparatus according to claim 7 which includes:
A. an AC controlled switch connected to said current regulatory means to terminate the charging process when the design maximum voltage level on said capacitor circuit is attained.

9. Apparatus according to claim 1 wherein:
A. said current regulatory means is an AC filter.

10. Apparatus according to claim 9 wherein:
A. said filter includes a circuit arrangement of an inductor and capacitor means of respective values $L_f$ and $C_f$;
B. said output being connected across one of said inductor or capacitor means; and wherein
C. $L_f$ and $C_f$ are chosen such that $\omega^2 L_f C_f = 0.5$ where $\omega = 2\pi$ times the fundamental frequency $f$ of the supply.

* * * * *